(No Model.)
J. JUDD.
TRELLIS HOOK.
No. 294,240. Patented Feb. 26, 1884.
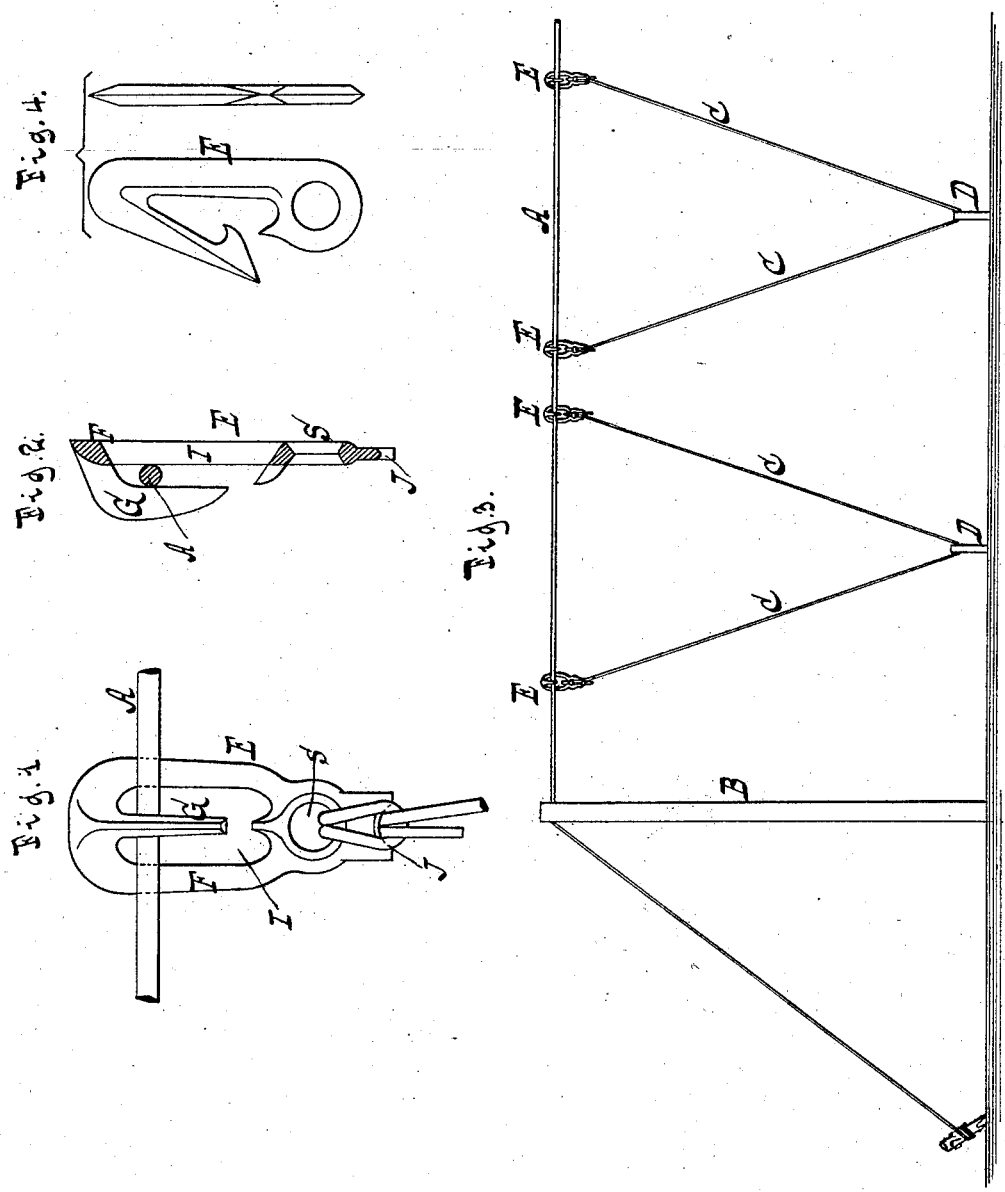
WITNESSES:
Otto Hufeland
William Miller
INVENTOR
John Judd
BY Van Santvoord & Hauff
his ATTORNEYS

United States Patent Office.

JOHN JUDD, OF CHERRY VALLEY, NEW YORK.

TRELLIS-HOOK.

SPECIFICATION forming part of Letters Patent No. 294,240, dated February 26, 1884.

Application filed April 7, 1883. (No model.)

*To all whom it may concern:*

Be it known that I, JOHN JUDD, a citizen of the United States, residing at Cherry Valley, in the county of Otsego and State of New York, have invented new and useful Improvements in Trellis-Hooks, of which the following is a specification.

This invention relates to the construction of hooks for joining cords to wire in the formation of trellises for hops or other plants, and especially such trellises in which the cords extend in oblique directions from suitable stakes to the wire, which is supported horizontally on "stay-poles," so called.

The novel features of my hook are hereinafter fully described and claimed, and illustrated in the accompanying drawings, in which—

Figure 1 represents a front view. Fig. 2 is a longitudinal section. Fig. 3 shows a portion of a trellis comprising the hook. Fig. 4 illustrates the hook which my invention is designed to supersede.

Similar letters indicate corresponding parts.

The letter A designates the wire, supported horizontally on stay-poles, one of which is shown at B, Fig. 3; and C indicates the cords, extending in oblique planes from stakes D to the wire, to which they are connected by hooks E, the ends of the cords being attached to the hooks, which catch on the wire.

Prior to my invention the hooks E were made narrow and of one and the same width throughout, as shown in Fig. 4. This form is objectionable, because the hooks are liable to shift on the wire, due to the slight frictional bearing of the hooks and the tendency of the cords to draw out or away from an oblique position when exposed to the wind. This objection I have overcome by extending the back or frame F of my hook laterally on both sides of its jaw G, as shown in Figs. 1 and 3, so that the hook forms three bearing-points for the wire—one at the inner surface of the jaw and two on the frame—thus exerting sufficient friction to prevent its displacement on the wire. In the example shown said back F of the hook is cast with an opening, I, to lessen its weight, and the bearing-points for the wire are on the raised edges of this opening. The jaw G of the hook is tapered in an inward direction toward the back, as shown in Fig. 2, and by this means said jaw is enabled to adapt itself to the size of the wire and to clamp it firmly upon the frame.

In the back F of the hook is an eye, S, for the attachment of the proper cord, and opposite to this eye, in the edge of the back, is a recess, J, which receives in it the loop or knot by which the cord is fastened, so that the loop is prevented from turning or shifting in the eye, and hence is exposed to the least wear. Said eye S and recess J are in the line of the jaw G of the hook, the eye being at a distance from the recess which is requisite in order to prevent the knot from turning in the eye.

What I claim as new, and desire to secure by Letters Patent, is—

A trellis-hook consisting of the frame F, having at one end the jaw G and at the opposite end the recess J and eye S, said recess being in the lower edge of the frame for receiving the loop or knot of the cord tied in the eye, to prevent the loop or knot from turning, substantially as described.

In testimony whereof I have hereunto set my hand and seal in the presence of two subscribing witnesses.

JOHN JUDD. [L. S.]

Witnesses:
WILLIAM J. STORY,
EDWIN JUDD.